United States Patent [19]

Lindner et al.

[11] 4,267,278

[45] May 12, 1981

[54] ABS MOULDING COMPOUNDS HAVING IMPROVED SURFACE

[75] Inventors: Christian Lindner, Cologne; Bernhard Arnold; Dieter Kuhlmann, both of Pulheim; Friedrich Kowitz, Dormagen; Karl-Heinz Ott, Leverkusen, all of Fed. Rep. of Germany

[73] Assignee: Bayer Aktiengesellschaft, Fed. Rep. of Germany

[21] Appl. No.: 141,203

[22] Filed: Apr. 17, 1980

[30] Foreign Application Priority Data

Apr. 20, 1979 [DE] Fed. Rep. of Germany ....... 2916136

[51] Int. Cl.$^3$ .............................................. C08K 5/53
[52] U.S. Cl. .......................................... 525/2; 525/6
[58] Field of Search ........................................... 525/2

[56] References Cited

FOREIGN PATENT DOCUMENTS 2,061,838  4/1976  Fed. Rep. of Germany .

*Primary Examiner*—Stanford M. Levin
*Attorney, Agent, or Firm*—Connolly and Hutz

[57] ABSTRACT

A thermoplastic moulding composition which comprises: (A) from 99.99 to 94% by weight of an ABS composition comprising: (a) from 5 to 70% by weight of one or more rubber-based graft polymers; and (b) from 95 to 30% by weight of one or more thermoplastic resins; and (B) from 0.01 to 6.0% by weight of one or more compounds corresponding to the following general formula:

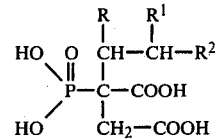

wherein R represents hydrogen, $C_1$-$C_4$-alkyl or carboxyl; $R^1$ represents hydrogen or methyl; and $R^2$ represents carboxyl, and which may also contain from 0.1 to 3% by weight of one or more compounds corresponding to the formula:

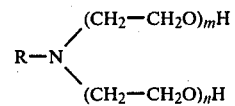

5 Claims, No Drawings

ABS MOULDING COMPOUNDS HAVING IMPROVED SURFACE

This invention relates to thermoplastic moulding compounds having improved surface and processing properties obtainable from ABS polymers and 2-phosphono-butane-1,2-dicarboxylic acid derivatives as additives.

One stage in the preperation of ABS moulding compounds is that of compounding, in which the graft polymer on rubber and the resinous copolymer are mixed and at the same time the additives required for subsequent processing and use are incorporated. The additives include, e.g. lubricants, pigments, antistatic agents, flame retarding agents and stabilizers.

Compounding is generally carried out in an internal kneader or in a two- or four-shaft kneading screw having a two-roll mill with band granulator or a strand or underwater granulator attached. The type of assembly used depends on the method of ABS preparation employed. If, for example, the required styrene/acrylonitrile copolymer ("SAN") is obtained as a solution polymer, it is mixed in a kneader screw with the separately-prepared powder of graft rubber; if polymerization is carried out solely in emulsion, the resulting powder is frequently processed in an internal kneader.

The lubricants used for ABS moulding compounds are preferably alkali metal and alkaline earth metal salts of fatty acids, fatty acid esters of mono- and poly-hydric alcohols, and amides of long chain fatty acids and sulphonic acids; examples of antistatic agents include ethoxylated alkylamines, salts of alkylsulphonic acids and/or polyalkylene oxide polyols.

The surface quality of injection moulded ABS containing lubricants and/or antistatic agents is frequently inadequate, especially, if high temperatures have been employed. For example, defects in the form of streaks may occur on smooth surfaces of mouldings.

The present invention is based on the finding that the addition of very small quantities of 2-phosphonobutane-1,2-dicarboxylic acid derivatives substantially improves the surface quality of ABS moulding compounds, which may otherwise contain the conventional auxiliary substances.

ABS moulding compounds for the purposes of the present invention are mixtures of:

(a) from 5 to 70%, by weight, of one or more rubber-based graft polymers; and (b) from 95 to 30%, by weight, of one or more thermoplastic resins.

The graft products (a) are preferably polymers obtained by the polymerization of graft monomers in the presence of a rubber as graft base. The rubber content is, generally, within the limits of from 5 to 80% by weight, based on 100 parts, by weight, of ABS moulding compound, and is determined to a certain extent by the choice of polymerization process.

Particularly suitable for use as graft base are polybutadiene, the polybutadiene-acrylonitrile copolymers and butadiene styrene copolymers (statistical or block copolymers), but acrylic acid/vinyl ether copolymers and ethylene/propylene copolymers may also be used, including terpolymers having unconjugated diolefins as the third component thereof (EPDM rubbers). The graft monomers are preferably styrene, mixtures of styrene and acrylonitrile (e.g. in proportions, by weight of from 90:10 to 50:50), mixtures of styrene and methyl methacrylate (e.g. in proportions, by weight, of from 5:95 to 95:5) and mixtures of styrene, acrylonitrile and methyl methacrylate. The preparation of such graft products is known.

The thermoplastic resin (b) constituting the second component of the ABS moulding compound forms the continuous matrix and is, generally, a polymer or copolymer of styrene, α-methyl-styrene, acrylonitrile, methyl methacrylate and maleic acid anhydride. It is preferred to use polystyrene, styrene/acrylonitrile copolymers containing from 20 to 35%, by weight, of acrylonitrile, and methyl styrene/acrylonitrile copolymers containing from 20 to 31%, by weight, of acrylonitrile. The average molecular weight of these resins is preferably from 50,000 to 550,000. The heterogeneity index, expressed as $$\frac{M_w}{M_n} - 1 = U_n \quad (M_w = \text{weight average molecular weight}; \ M_n = \text{number average molecular weight}),$$

is preferably from 1.0 to 3.5.

Phosphorus compounds suitable for the purposes of the present invention are derivatives of 2-phosphono-butane-1,2-dicarboxylic acids corresponding to the following general formula (I):

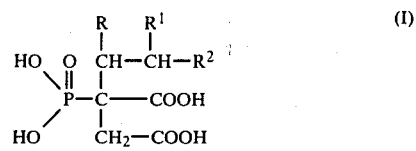

wherein R represents H, $C_1$–$C_4$ alkyl or carboxyl; $R^1$ represents H or methyl; and $R^2$ represents carboxyl; e.g.

2-phosphono-butane-tricarboxylic acid-(1,2,4);

2-phosphono-3-methyl-butane-tricarboxylic acid-(1,2,4);

2-phosphono-butane-tetracarboxylic acid-(1,2,3,4);

2-phosphono-3-butyl-4-propyl-tricarboxylic acid-(1,2,4);

2-phosphono-butane-tricarboxylic acid-(1,2,3); and 2-phosphono-pentane-tricarboxylic acid-(1,2,3);

2-phosphono-butane-tricarboxylic acid-(1,2,4) is particularly preferred.

These compounds are known and have been described in German Auslegeschrift No. 2,061,838. When these compounds are added to ABS moulding compounds, the injection moulded articles obtained have excellent surface qualities.

The present invention accordingly relates to thermoplastic moulding compounds consisting of from 99.99 to 94%, by weight, preferably from 99.99 to 97%, by weight, of ABS moulding compound and from 0.01 to 6.0%, by weight, preferably from 0.1 to 3.0%, by weight, of 2-phosphonobutane-1,2-dicarboxylic acid derivative corresponding to general formula (I). The substances may contain up to 3.0%, by weight, preferably from 0.1 to 3.0%, by weight, of other, conventional additives, such as antistatic agents, lubricants and flame-retarding agents. It is particularly preferred to use from 0.5 to 2.0%, by weight, of antistatic agents corresponding to the following general formula (II):

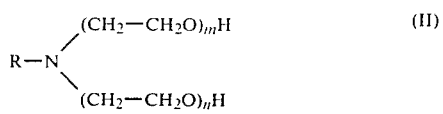

(II)

wherein n and m each represents an integer of from 1 to 10; and R represents a $C_1$-$C_{20}$ alkyl group.

The present invention also relates to the use of from 0.01 to 3.0%, by weight, preferably from 0.1 to 1.0%, by weight, of 2-phosphonobutane-1,2-dicarboxylic acid derivative (I) as additive for ABS blends.

EXAMPLES (A) Preparation and Characteristics of the ABS Blends

The following process was employed for the preparation of the ABS blends used in the subsequent Examples:

The graft rubber prepared by emulsion polymerization is mixed by latex mixing with certain proportions of one or more than one SAN copolymer prepared by emulsion polymerization. After the addition of an aqueous stabilizer dispersion containing from 0.25 to 1.5 parts, by weight, of a phenolic antioxidant per 100 parts, by weight, of polymer, the latex mixture is coagulated by the addition of electrolyte. The resulting powder is dried in a vacuum drying cupboard at a temperature of from 70° to 80° C.

The particulars given in Tables 1 and 2 below apply to the ABS graft rubber or SAN copolymer used for the preparation of the blend.

TABLE 1

Graft rubber used in the Examples

| Name of Graft poly- | Proportion, by weight, Graft base: graft | Proportion, by weight, styrene: ACN in monomer mixture | Average particle diameter in μ[1] | G-value[2] | Composition of graft base B[3] |
|---|---|---|---|---|---|
| P1 | 50:50 | 70:30 | 0.4 | 0.55 | 100 |

[1]Ultracentrifuge measurements, see W. Scholtan, H. Lange, Kolloidz. und Z. Polymere 250 (1972) 783-796 or G. Kampf, H. Schuster, Angew. Makromol. Chemie 14 (1970) 111-129. By "particle diameter" is always meant the $d_{50}$ value.
[2]Degree of grafting G (G-value) means the ratio "SAN" grafted as non-dimensional figure. graft base
[3]B = butadiene

TABLE 2

SAN copolymer and α-methylstyrene/acrylontrile copolymer used in the Examples

| Co-polymer name | Copolymer composition (%, by weight) Styrene ADM : α-methyl-styrene | Viscosity[1] ηspec. C | $U_n$-value[2] |
|---|---|---|---|
| S 1 | 74:26 | 95 | 3.0 |
| S 1 | 70:30 | 110 | 2.5 |

[1]Viscosity = $\frac{\eta spec.}{C}$ at C = 5 g/l MEK, 25° C

[2]$U_n$-value = $\frac{M_w}{M_n} - 1$ wherein $\frac{M_w}{M_n}$ = weight average molecular weight / number average molecular weight (B) Preparation of the Moulding Compounds According to the Present Invention The compounding apparatus known in the art may be used for preparing the moulding compounds according to the present invention, provided homogeneous mixing is achieved within the temperature range of from 140° to 260° C. These apparatus include, inter alia, heatable mixing rollers with granulators attached, two- or four-shaft kneader screws with granulating devices attached, internal mixers and Banbury mixers coupled with two-roll mills and granulators.

For compounding in a Banbury mixer BR (Pomini-Farrel), the following mixing conditions apply to ABS polymer blends:

Mass temperature: 190°-225° C.
Mixing time: 1.5-2 minutes
Cycle time: 2-4 minutes.

After completion of the mixing process, the material is obtained as a plastic mass on a two-shaft mill (roller 1 T=160° C., roller 2 T=150° C.) and is removed in the form of a band which is then granulated after cooling.

(C) Method of Testing

Plates measuring 6×3.5×0.2 cm are prepared from the granulate by injection moulding at a mass temperature of 280° C. The surface quality of such samples is assessed visually and the assessment is graded.

EXAMPLES 1 TO 9

Starting with graft polymer P 1 and resin polymer S 2, a blend of the following composition is prepared by latex mixing:

P 1: 400 parts, by weight
S 1: 600 parts, by weight

The powder is then processed in a Banbury mixer BK in accordance with the particulars given under (B). At the compounding stage, the following are added (in parts, by weight) to 100 parts, by weight, of powder:

| Example | 2-Phosphonobutane-tricarboxylic acid- (1,2,4) | Other additives A* | B* | C* |
|---|---|---|---|---|
| 1 | — | 2 | — | — |
| 2 | — | 2 | 2 | — |
| 3 | — | 2 | 1.5 | 0.5 |
| 4 | 0.05 | 2 | — | — |
| 5 | 0.05 | 2 | 2 | — |
| 6 | 0.05 | 2 | 1.5 | 0.5 |
| 7 | 0.4 | 2 | — | — |
| 8 | 0.4 | 2 | 2 | — |
| 9 | 0.4 | 2 | 1.5 | 0.5 |

A* = N,N'-bis-stearic acid amide of ethylene diamine
B* = $(C_{14}H_{29})$ N $(CH_2CH_2OH)$ $(CH_2CH_2OCH_2CH_2$—OH)
C* = $C_{15}H_{31}$—$SO_3$ Na Visual assessment of test samples prepared from ABS mixtures 1 to 9 according to Section (C):

| ABS Blend mixtures | Surface quality of injected moulded parts, assessed visually* |
|---|---|
| 1 | — |
| 2 | — — |
| 3 | — — |
| 4 | + + |
| 5 | + |
| 6 | + |
| 7 | + + |
| 8 | + + |
| 9 | + + |

*
— Disturbance of surface by streaks
— — Disturbance of surface by a large number of streaks
+ Disturbance of surface by isolated streaks
+ + No formation of streaks may be detected on the surface

EXAMPLES 10 TO 15

Starting with graft polymer P 1 and resin polymer S 1, a blend of the following composition is prepared by latex mixing:

P 1: 325 parts, by weight
S 1: 675 parts, by weight.

The powder was processed in a Banbury mixer BK in accordance with the particulars given under (B). At the compounding stage, the following are added (in parts, by weight) to 100 parts, by weight, of powder;

3 parts, by weight of Compound (A)
1 part, by weight of Compound (B)
0.5 part, by weight, of polypropylene oxide diol (molecular weight 2000 determined by measurement of OH number).

This ABS polymer blend is made up into test samples with or without the addition of the phosphone compound and worked-up as described under (C) although using different mass temperature in the injection moulding process:

| Example | 2-Phosphonobutane-tricarboxylic acid-(1,2,4) (parts, by weight) | Mass temperature in injection moulding process (°C.) |
|---|---|---|
| 10 | — | 220 |
| 11 | — | 250 |
| 12 | — | 280 |
| 13 | 0.5 | 220 |
| 14 | 0.5 | 250 |
| 15 | 0.5 | 280 |

Visual assessment of test samples moulded from the mixtures:

| ABS blend mixtures | Surface quality of injection moulded parts, assessed visually |
|---|---|
| 10 | + |
| 11 | − |
| 12 | − − |
| 13 | + + |
| 14 | + + |
| 15 | + + |

It may be seen from Examples 1 to 15 that the surface qualities of injection moulded articles produced from ABS polyblends containing the conventional additives are substantially improved by the addition of small quantities of 2-phosphonobutane-1,2-dicarboxylic acid derivatives, especially when high mass temperatures are employed in the injection moulding process.

We claim:

1. A thermoplastic molding composition comprising
(A) from 99.99 to 94% by weight of a composition comprising
   (a) from 5 to 70% by weight of at least one rubber based graft polymer and
   (b) from 95 to 30% by weight of at least one thermoplastic resin and
(B) from 0.01 to 6.0% by weight of at least one compound of the formula

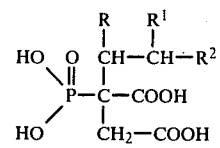

wherein R is hydrogen, $C_1$-$C_4$ alkyl or carboxyl; $R^1$ is hydrogen or methyl and $R^2$ is carboxyl.

2. The composition of claim 1 comprising 99.9 to 97% by weight of (A) and 0.1 to 3.0% by weight of (B).

3. The composition of claim 1 wherein (B) is 2-phosphono-butane-tricarboxyl acid-(1,2,4).

4. The composition of claim 1 containing 0.1 to 3.0% by weight of at least one antistatic agent of the formula

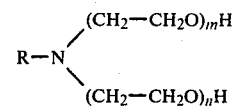

wherein R is $C_1$-$C_{20}$ alkyl and n and m are each independently an integer of from 1 to 10.

5. The composition of claim 4 containing from 0.5 to 2.0% by weight of at least one antistatic agent.

* * * * *